(12) United States Patent
King (10) Patent No.: US 7,013,336 B1
(45) Date of Patent: Mar. 14, 2006

(54) METHOD AND STRUCTURE FOR EFFICIENTLY RETRIEVING STATUS FOR SCSI ACCESSED FAULT-TOLERANT ENCLOSURE (SAF-TE) SYSTEMS

(75) Inventor: Allen King, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 09/539,459

(22) Filed: Mar. 30, 2000

Related U.S. Application Data (60) Provisional application No. 60/127,233, filed on Mar. 31, 1999.

(51) Int. Cl.
*G06F 11/30* (2006.01)

(52) U.S. Cl. ...................................... 709/224; 709/227
(58) Field of Classification Search ................ 709/224, 709/227
See application file for complete search history.

(56) References Cited

U.S. PATENT DOCUMENTS

| | | | |
|---|---|---|---|
| 5,337,413 A * | 8/1994 | Lui et al. ........................ | 710/2 |
| 5,535,335 A * | 7/1996 | Cox et al. ..................... | 709/221 |
| 5,652,839 A * | 7/1997 | Giorgio et al. ............. | 709/224 |
| 5,774,045 A * | 6/1998 | Helma et al. ................ | 340/436 |
| 6,311,274 B1 * | 10/2001 | Day ............................ | 713/201 |
| 6,408,343 B1 * | 6/2002 | Erickson et al. ............... | 710/15 |
| 6,470,385 B1 * | 10/2002 | Nakashima et al. ......... | 709/224 |

* cited by examiner

*Primary Examiner*—Rupal Dharia
*Assistant Examiner*—April L. Baugh
(74) *Attorney, Agent, or Firm*—R. Michael Ananian; Arthur J. Samodovitz (57) ABSTRACT

A method for determining a change in the SAF-TE enclosure status and a change in the SAF-TE device slot status, each with a single issuance of one new command, replacing countless re-issuance of similar commands. Use is made of a common disconnection/reconnection capability as well as a tagged command queuing technique, such that multiple types of status changes in a SAF-TE enclosure are concurrently determined. Since each of the new commands described here is initiated by the host adapter, the host adapter is prepared for receiving asynchronously a changed status from the reconnecting target device such as a SEP whenever it becomes available, without resorting to use of a complex SCSI protocol known as "asynchronous event notification." Status fields in the data packets transferred by the commands introduced in this invention may be the same as those in conventional systems, and so the inventive commands are a natural extension to conventional systems and may be adapted while maintaining compatibility with existing hardware and protocols. Removes stringent SEP response time requirements and causes negligible host system performance impact independent of how many SAF-TE enclosures are attached to the host adapter. Provides for use of an optional convenience timer for the SAF-TE Processor (SEP) device to check in with its current status before a status change occurs. Maintains backward compatibility by detection of an absence of the "tagged command queuing" indicator in inquiry data from the SEP device with implementations that do not support the inventive commands. Computer software and firmware implementations are provided.

14 Claims, 6 Drawing Sheets

METHOD AND STRUCTURE FOR EFFICIENTLY RETRIEVING STATUS FOR SCSI ACCESSED FAULT-TOLERANT ENCLOSURE (SAF-TE) SYSTEMS

This application claims benefit of 60/127,233 filed Mar. 31, 1999.

FIELD OF THE INVENTION

This invention pertains generally to a structure and method for communicating status information between a host processor or host adapter and one or more devices coupled to the host processor and more particularly to structure and method for polling for a change in a SCSI Accessed Fault-Tolerant Enclosure (SAF-TE) status with the issuance of a single command.

BACKGROUND OF THE INVENTION

Conventional computer systems, particularly computer systems that operate as server systems, frequently provide a plurality of hard disk drive storage devices configured as an array. Frequently, the array of disk drives is configured using one of the conventional RAID techniques to enhance data reliability. Several levels of RAID (for example, RAID 1 through RAID 5) are known in the art and not described here in detail. These RAID disks are conventionally disposed mechanically and electrically in a protective housing which provides mechanical mounting, power supply, cooling (typically with one or more rotating fans), interface connections to the host computer via a host adapter often through a pluggable SCSI connector, and information display means such as colored LEDs, Liquid Crystal Display (LCD) to provide status information, audible alarms, and the like.

Frequently, the RAID disk drive array is disposed in one or more enclosures that meet the SCSI Accessed Fault-Tolerant Enclosures (SAF-TE) Interface Specification. The objective of this Interface Specification is to provide a standard way for disk and disk controllers (especially for RAID controllers) to be automatically integrated with peripheral packaging to support status signals (including LEDs, LCD displays, audible alarms, temperature sensing, etc.), hot swapping of hard disk drives, and monitoring of components within the disk drive enclosure. Standardization permits a system vendor to integrate alternative third party controllers, disk drives, and peripheral packaging knowing that they will operate in a predictable manner and knowing that a selected controller will work with a variety of components that comply with the standard either at the time of initial integration or later during product revision or upgrade. Revision 1.0 (17 Oct. 1995) of this SAF-TE Interface Specification and the SAF-TE Addendum Sheet Updated 11 Jul. 1996 and incorporated herein by reference.

The SAF-TE standard is currently implemented on a SCSI microprocessor device, and SCSI provides the underlying transport mechanism for communicating enclosure information so that standard SCSI host adapters will work in the SAF-TE environment and no special considerations such as reserved signals on the SCSI bus need be anticipated. So called "target devices" that implement the SAF-TE Interface Specification are collectively referred to as the SAF-TE Processor (SEP) device. In the SAF-TE context, all communication is initiated by the host and the SAF-TE Processor device acts only in a target role. The current version of the SAF-TE interface specification is implemented on a SCSI microprocessor device and the SAF-TE Processor device should conform to the ANSI SCSI-2 specification for processor devices. (The ANSI SCSI-2 Specification Version is hereby incorporated by reference.)

A brief description of selected SCSI Commands and Messages is provided so that the context of the invention may be understood more readily; however, additional details are available in the afore referenced SAF-TE Interface and ANSI SCSI-2 specifications.

SAF-TE conventionally supports six SCSI commands: WRITE BUFFER, READ BUFFER, INQUIRY, TEST UNIT READY, SEND DIAGNOSTIC, and REQUEST SENSE. Receipt by the SEP devices of a command with any other operation code (opcode) will be interpreted as an Invalid CDB Operation Code and result in a Check Condition within a SAF-TE.

The SAF-TE is a polling based interface, and while the SAF-TE Interface Specification does not place any formal restriction on polling frequency, the specification states that it expects most implementors to poll the SEP once every two to ten seconds. The specification also recommends that the maximum response time of the SEP device to any WRITE BUFFER or READ BUFFER command should be less than two milliseconds, and that the maximum recovery time of the SEP device from a SCSI bus reset should be 30 milliseconds.

A SCSI Message phase allows informational messages to be exchanged between an initiator (e.g. the host) and a target (e.g. the SEP). SCSI Messages supported include ABORT, BUS DEVICE RESET, COMMAND COMPLETE, IDENTIFY, INITIATOR DETECTED ERROR, MESSAGE PARITY ERROR, MESSAGE REJECT, and NO OPERATION. These messages are described in greater detail in the SCSI-2 Specification.

While the drafters of the SAF-TE interface specification suggested in 1995 that minimal performance impact was to be expected due to the short duration (for example, a few milliseconds) and low frequency (for example, from about two to about ten second interval) of the polling, the impact is significant when the polling cycle time is up to 100 ms or longer in some implementations and has become more severe as the initial response time of the polling of the SAF-TE unit-ready status is longer than expected and the number of required SAF-TE enclosures for each SCSI bus or channel grows larger. The increase in processor speeds and the increases and demands on network servers have also made the problem worse. For example, the effect on a typical 1995 RAID configuration (e.g. two SCSI channels, each channel having one SAF-TE enclosure) was typically less than two percent [(100 ms/channel)×(2 channels)÷10000 ms=0.02]; while for a high performance RAID system in 1998–1999 (e.g. 3 to 4 SCSI channels, each channel having three SAF-TE enclosures) the impact is in the nine- to twelve-percent range [3×(100 ms/SAFTE)×(3 SAFTE) ÷10000 ms=0.09]. Therefore, there is a need for a structure and method that can reduce the impact of polling. At the Ultra-2 speed of 80 MB/sec, about 26 Gigabyte (GB) of additional data can be received in one hour using the bandwidth freed by conventional SAF-TE polling. It is highly desirable for applications such as video-on-demand and video or other image streaming to have this additional capacity. One industry study has shown that on a Digital Equipment Corporation (DEC) video server using 200 MPEG-2 (420 KB/sec) video streams, a two-hour video movie requires the transfer of 4.2 GB of data. Therefore, the ability to transfer approximately 52 Gigabyte (GB) of additional data over a two hour time period is enough to communicate twelve additional movies using the same equipment, or to meet the same need using less equipment.

The SAF-TE interface is now briefly described The SAF-TE interface is a set of processor device commands that the host system may use to request specific actions of the target processor. These processor device commands fall into two general categories: (1) those commands that request some action to be performed in the enclosure are sent to the SEP device with a WRITE BUFFER operation, and (2) those commands that request information from the SEP device and are sent to the SEP device using a READ BUFFER command. As there are different types of conventional READ BUFFER and WRITE BUFFER data packets, each of these commands provides distinguishing single-byte opcodes to implement the desired functionality. Opcodes in the range of 00h to 7fh are reserved for standardized commands while opcodes in the 80h to FFh are open and available for vendor specific use under the standard. READ BUFFER and WRITE BUFFER commands are now summarized.

READ BUFFER commands include: Read Enclosure Configuration (00h), Read Enclosure Status (01h), Read Usage Statistics (02h), Read Device Insertions (03h), and Read Device Slot Status (04h). WRITE BUFFER commands include: Write Device Slot Status (10h), Set SCSI ID (11h), Perform Slot Operation (12h), Set Fan Speed (13h), Activate Power Supply (14h), and Send Global Command (15h). Some of the commands are mandatory under the SAF-TE standard while others are optional.

Conventionally, standard SCSI Host Adapters (HAs) including most (if not all) Redundant Array of Independent Disk (RAID) controllers communicate regularly with all attached SCSI Accessed Fault-Tolerant Enclosures (SAF-TE) using a well-defined protocol. Each SAF-TE supports status signals (LEDs, audible alarm, LCD, etc.), hot swapping of hard disk drives, and monitoring of all enclosure components.

All communication is initiated by the host. The SAF-TE's Processor (SEP) device acts only in a target role. Asynchronous Event Notification is not used. The SEP device is periodically polled by the host through the host adapter to detect changes in status.

Drive failure indications are controlled by the host (adapter) through a command set because it is the host that knows if a drive has failed. Status indicators for other components, such as fans and power supplies, is automatically controlled by the SEP device. Drive insertion in or removal from the slot is sensed by the SEP device first.

Although there is no specific restriction on SEP polling frequency, Host Adapters poll the SEP once every few seconds (generally 10 seconds or less) continuously. Depending on implementation, the time it takes to poll a SAF-TE enclosure each time including the time to execute a typical set of five commands that accomplish the polling. Empirical measurements have shown that the total execution time for available devices varies between about 60 millisec and about 250 millisec with a typical time of about 100 millisec. For example, these commands and a typical time for execution are as follows: "Test Unit Ready" (10 ms), "Read Buffer" for Device Slot Status (25 millisec), "Test Unit Ready" (10 millisec), "Read Buffer" for Enclosure Status (25 millisec), and "Write Buffer" for Device Slot Status (25 millisec).

With a current 16-bit wide SCSI bus (or referred to as SCSI channel), up to fourteen (14) drive slots (each having or configurable for a single disk drive) may be used. Although it is theoretically possible to have seven (7) single-slot enclosures for the entire bus, most commercially available SAF-TE enclosures provide 4 to 6 drive slots each. Three such enclosures may be used to share the entire bus. a SAF-TE enclosure with four to six slots is commercially desirable because of ease of packaging, and powering and cooling the devices within the enclosure; whereas an enclosure with seven (7) or fourteen (14) slots is not commercially desirable because there is only one disk drive in each of seven enclosures, and one fourteen-slot enclosure is in practical terms unmanageable in terms of power, cooling, and packaging.

Figure 2:
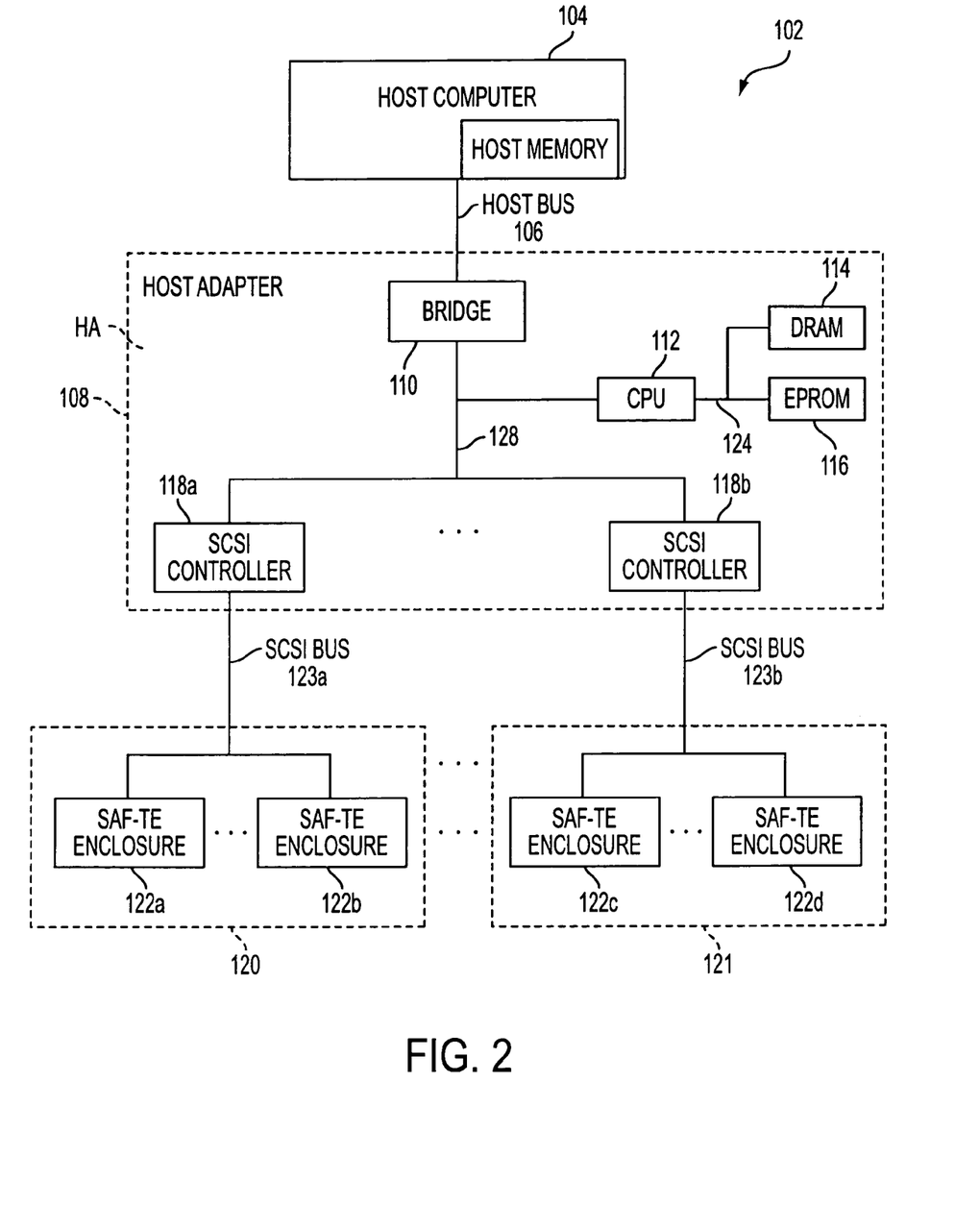
FIG. 2 is a diagrammatic illustration showing an embodiment of the inventive structure showing additional details of the host adapter and SAF-TE enclosures for the system in FIG. 1.

Host adapters that control multiple (two, three, or potentially more) SCSI channels each are plentiful. Therefore, it is not unusual for a host adapter to poll nine (or more) SAF-TE enclosures (for example, three channels each having three SAF-TE enclosures which themselves have four disk drives each) for their status changes constantly when a significant number of drives are required, as is the trend of the ever-expanding storage subsystem used in contemporary client/server computing. A maximum of sixteen bits are available, three bits for the SEP, and twelve bits for the target ID's, so that three enclosures with four disks per enclosure may be supported. In FIG. 2 there is illustrated an exemplary configuration of a host 32 coupled for communication to Host Adapter (HA) 34, where Host Adapter 34 provides first and second SCSI bus 36, 38 connections to two sets of three SAF-TE enclosures 41 (41a, 41b, 41c, 41d, 41e, 41f).

In spite of the frequent polling of each SAF-TE, the changes that may be detected as a result of the polling (for example, changes in drive operational status, drive slot status, or SAF-TE component status) do not occur so frequently. In fact, in a system that has reached normal operating temperature as is operating normally and without intentional operator intervention (such as removal or insertion of a disk drive), no significant change will typically occur for periods of from weeks, to months or longer. The average mean-time between failures (MTBF) for a disk drive used in server applications is several thousand hours. Of course while some events are rare or infrequent (such as a device, cooling fan, or other component failure) it may generally be important to receive notification of that event quickly so that appropriate remedial action can be taken. Conventional SEP polling under the SAF-TE Interface standard as described above is largely non-productive and the SCSI bus bandwidth is poorly utilized and the host adapter resource is significantly misused.

Furthermore, in order to minimize system performance impact, maintaining the prescribed timing restrictions, such as the standard's requirement that maximum response time of the SEP device to any status-passing WRITE BUFFER or READ BUFFER command be kept below 2 milliseconds, are likely to increase the overall cost of SAF-TE hardware. Many systems do not meet this recommendation and may have a response time on the order of about 25 millisec. Hardware costs increase because a faster microprocessor and higher speed memory, and in some instances hard-wired logic, may be required.

The SCSI Accessed Fault-Tolerant Enclosures Interface Specification recommends that the host adapter continuously poll the SEP device once every 10 seconds or less. This polling is ordinarily performed by issuing a sequence of five commands (TEST UNIT READY, READ BUFFER, TEST UNIT READY, READ BUFFER, WRITE BUFFER) as listed in Table I with appropriate parameters or arguments and expecting immediate response (that is a response typically on the order of about 30 milliseconds or less) to the SEP without disconnection or tagged command queuing.

TABLE I

List of SEP commands to implement SAF-TE Recommended Periodic Polling

| SCSI Command Name | Command Descriptor Block | Remarks |
|---|---|---|
| | (Each byte is shown in hex; byte 0 is on the left) | |
| TEST UNIT READY | 00 00 00 00 00 | |
| READ BUFFER | 3c 01 04 00 00 00 00 40 00 | Read Device Slot Status command |
| TEST UNIT READY | 00 00 00 00 00 | |
| READ BUFFER | 3c 01 01 00 00 00 00 80 00 | Read Enclosure Status command |
| WRITE BUFFER | 3b 01 00 00 00 00 00 nn 00 | Write Device Slot Status command (where nn = No. slots × 3 + 1) |

The SCSI READ BUFFER Command Descriptor Block (CDB) has the structure illustrated in Table I. The READ BUFFER command is used to receive a data packet from the SEP device in a DATA IN phase. These data packets are the method of transferring enclosure status information to the initiator (HA). These fields in the conventional READ BUFFER command are known in the art and we only address the contents of them briefly here. The 8-bit Operation Code (Opcode) field in byte 0 should hold 3Ch (3C hexadecimal); the 3-bit Logical Unit Number in byte 1 should hold 000b (000 binary); the two-bit Reserved field contains 00b; and the three-bit Mode field holds (001b or 01h) to indicate that the data buffer is in the SAF-TE command format. The Buffer ID byte determines the content and format of the data packet to be transferred to the initiator during the data phase. If set to 01 h, the CDB is a Read Enclosure Status command. If set to 04h, the CDB becomes a Read Device Slot Status command. Bytes 3–6 are each set to 00h (zero) to signify that the bytes are unused. Transfer Length (MSB, LSB) is the size of the data packet (in bytes) to be transferred in the data phase of this command. Byte 9 of the READ BUFFER CDB is set to 00h to signify that it is unused.

The SCSI WRITE BUFFER command descriptor block has a similar format except that the Op code is 3Bh, and that byte 2 is set to 00h instead of being used as Buffer ID. The contents of the other bytes depend on the particular type or mode of WRITE BUFFER operation, for example, whether a WRITE SEP DEVICE Command (Mode 01h) as illustrated in Table II or an UPLOAD FIRMWARE Command (Mode 04h) is issued. The structure of a WRITE BUFFER-Write SEP Device Command is illustrated in Table II, the structures of the WRITE BUFFER Command for other modes is known in the art and also described in the SCSI Accessed Fault-Tolerant Enclosures Specification and incorporated herein by reference.

The Read Enclosure Status command is used by the host to find the operational status of the components of the enclosure and causes the SEP device to transfer to the host adapter operational status information on components in the enclosure such as fans, power supplies, temperature sensors, temperature out of range indicators, door locks, SCSI ID mapping for drive slots, and the like information. The host is expected to pass the component status information to the user for corrective actions if necessary. Corrective action may include, for example, replacing the failing cooling fan, power supply, or disk drive. The existence and number of such components included in the enclosure are indicated by means of a command known as Read Enclosure Configuration command, another derivative of the READ BUFFER command issued by the HA at a power-on time or after a system reset.

The Read Device Slot Status command causes the SEP device to transfer for each slot, four bytes of drive and drive slot status information to the host adapter. The first three bytes of these four bytes are defined exactly the same as those for the Write Device Slot Status command and generally duplicate what is transmitted by the host adapter on the preceding Write Device Slot Status command for that slot, except upon powering up the host system. The fourth byte indicates whether a drive is inserted in the particular slot or not, whether the slot is ready for insertion/removal, and whether the slot is prepared for operation.

The Write Device Slot Status command causes the host adapter to transfer to the SEP device three bytes of drive status information for each device slot. That information includes the drive state and configuration setup, drive operational status, drive error conditions and the state of array, if any, in which the drive is a configured member. The state of the array may, for example, be normal, critical (where one member drive has failed), or off-line.

TABLE I

Structure of READ BUFFER CDB

| | Bits | | | | | | | |
|---|---|---|---|---|---|---|---|---|
| Byte | 7 | 6 | 5 | 4 | 3 | 2 | 1 | 0 |
| 0 | Operation Code (3Ch) | | | | | | | |
| 1 | Logical Unit Number | | | Reserved (00h) | | | Mode (01h) | |
| 2 | Buffer ID | | | | | | | |
| 3 | (not used) | | | | | | | |
| 6 | 00h | | | | | | | |
| 7 | Transfer Length (MSB) | | | | | | | |
| 8 | Transfer Length (LSB) | | | | | | | |
| 9 | 00h | | | | | | | |

TABLE II

Structure of WRITE BUFFER - Write SEP Device Command

| | Bit | | | | | | | |
|---|---|---|---|---|---|---|---|---|
| Byte | 7 | 6 | 5 | 4 | 3 | 2 | 1 | 0 |
| 0 | Operation Code (3Bh) | | | | | | | |
| 1 | Logical Unit Number | | | Reserved | | | Mode (01h) | |
| 2 | 00h | | | | | | | |
| 3 | 00h | | | | | | | |
| 4 | 00h | | | | | | | |
| 5 | 00h | | | | | | | |
| 6 | 00h | | | | | | | |
| 7 | Transfer Length (MSB) | | | | | | | |
| 8 | Transfer Length (LSB) | | | | | | | |
| 9 | 00h | | | | | | | |

Each SAF-TE enclosure actually contains LEDs, audible alarms, etc., which are activated as a result of the status flags set/reset through the Write Device Slot Status command.

The fourth byte of the status information transferred by the Read Device Slot Status command indicates that a drive replacement action occurs (that is, a drive is removed and another drive is inserted), and whether the drive is prepared for operation. A drive insertion also causes bit seven in the first byte referred to as the "unconfigured" flag to be set. This serves as an indication that the drive was replaced so that a drive swap is not potentially ignored. The host adapter gets the indication that the "unconfigured" flag is set to "1" by the SEP device, and may trigger some action on the newly inserted drive, such as rebuilding the newly inserted drive with reconstructed data calculated based on what is recorded on other members of the redundant drive array (e.g RAID array) if the drive in that slot was so configured and went off-line, or making the new drive a "hot spare" for an array. In other instances when the host adapter gets the Check Condition status from the SEP it will not trigger any particular action, for example, no action is generally triggered when the SEP returns Check Condition status in response to a command. Note that all commands listed above (Inquiry, Test Unit Ready, Read Buffer, Write Buffer, Request Sense) are subject to the normal "command completion" timeout (typically on the order of about five to ten seconds) for failure to complete promptly; that is, to complete within a timeout period established by the host adapter.

The current main means for exchanging status between the host adapter and SAF-TE enclosures is regularly polling the SEP device by the host adapter at predetermined intervals, for example at two to ten second intervals, where typically the SEP device is polled at least once every 10 seconds, as described above.

SUMMARY OF THE INVENTION

This invention devises a method for polling a change in the SAF-TE enclosure status and a change in the SAF-TE device slot status, each with a single issuance of one new command, replacing countless re-issuance of a similar commands defined in the conventional systems and methods and checking and re-checking for a status change by the host adapter. Use is made of a common disconnection/reconnection capability available with a majority of SCSI devices used as targets. Use is also made of tagged command queuing technique as used by disk drives, tape drives, and other devices, such that multiple types of status changes in a SAF-TE enclosure are concurrently polled for. Since each of the new commands described here is initiated by the host adapter, the host adapter is prepared for receiving asynchronously a changed status from the reconnecting SEP whenever it becomes available, without resorting to use of a complex SCSI protocol known as "asynchronous event notification". Status fields in the data packets transferred by the commands introduced in this invention may be the same as those in conventional systems, and so the invention commands are a natural extension to conventional systems and may be adapted while maintaining compatibility with existing hardware and protocols. The inventive structure and method removes stringent SEP response time requirements and causes negligible host system performance impact independent of how many SAF-TE enclosures are attached to the host adapter. This inventive structure and method also provides for use of an optional "convenience" timer for the SAF-TE Processor (SEP) device to check in with its current status before a status change occurs; the time may be as many minutes or hours as considered practical by implementers, certainly longer (where it is desired to be longer) than the ten second or less time used in conventional systems. This inventive structure and method lend themselves to maintaining backward compatibility by detection of an absence of the "tagged command queuing" indicator in inquiry data from the SEP device with implementations that do not support the inventive commands.

DETAILED DESCRIPTION OF EMBODIMENTS OF THE INVENTION

Figure 1:
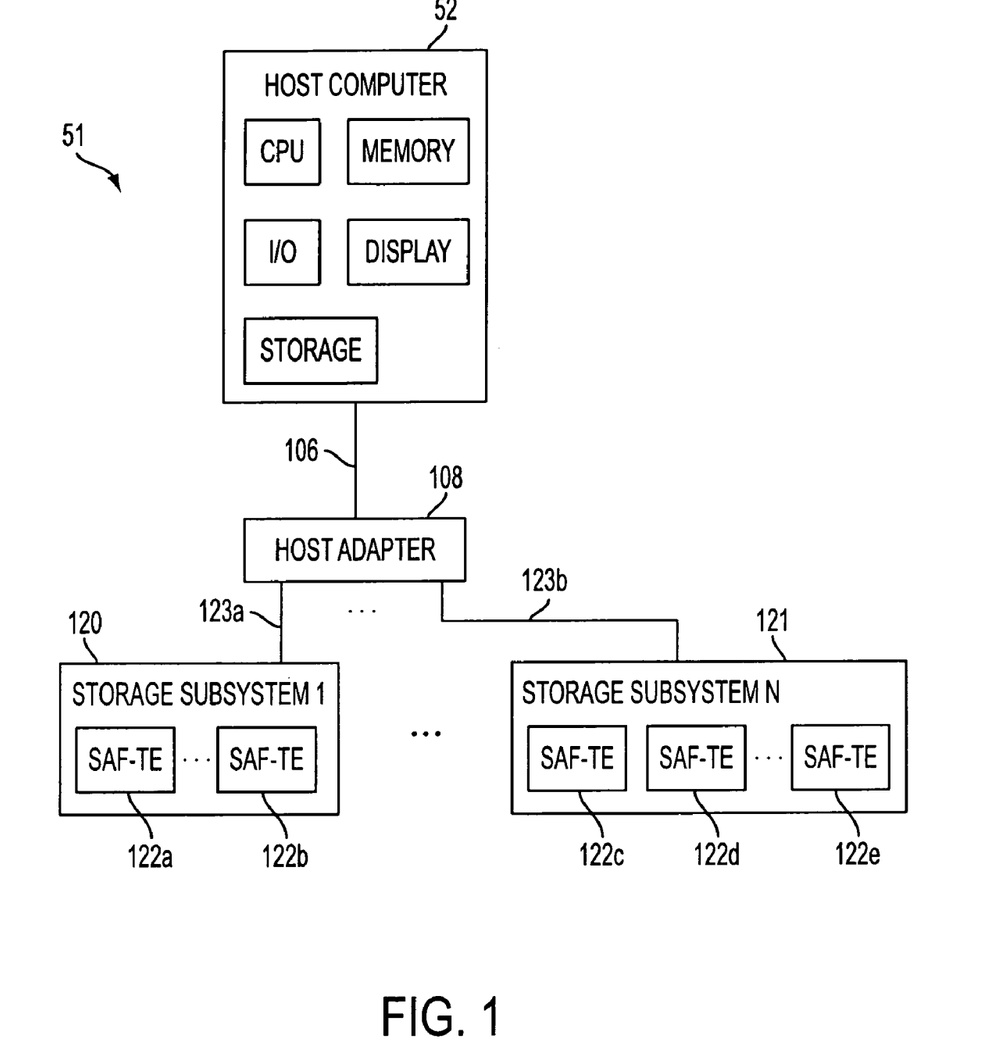
FIG. 1 is a diagrammatic illustration showing an embodiment of a computer system incorporating elements of the inventive structure and method.

With reference to FIG. 1, there is illustrated an embodiment of an inventive computer system 51 having a host computer 52, a host adapter 108 coupled to the host computer by a host bus 106, and a plurality of data storage subsystems 120 each including one or more SAF-TE enclosures 122 coupled to the host adapter (HA) 108 by an appropriate communications link or bus 123. In the embodiment described here, the bus 123 is a SCSI bus and several versions of SCSI are currently supported, including SCSI-I, SCSI-2, SCSI-3, and the like. Furthermore, the various buses identified here, including the HA-to-SAF-TE physical link may be either wire (e.g. copper wire) or fibre. It should be understood however, that the invention should not be limited to only SCSI protocol, or SCSI busses, and that the inventive structure and method may be applied to other architectures and communication protocols.

For example, the inventive structure and method may be used for fibre-channel based systems having the same electrical and/or mechanical components and using any of the Test Unit Ready, Read Buffer, Write Buffer, or equivalent commands or data structure. The SAF-TE is a fault-tolerant SCSI enclosure; however, the invention may be applied more generally relative to fault-tolerant device or system enclosures even where neither the enclosure nor the devices within the enclosure are SCSI based, and even more broadly to status updates for systems other than fault-tolerant systems. For example, the devices may be printers, modem, scanners, other input/output devices, or any other device or system.

Those workers having ordinary skill in the art will appreciate after reviewing this specification and the attached claims, that the inventive structure and method may generally be used for any contemporary client/server computer system having at least storage devices and their enclosures that monitor power, cooling, and or audio/video/data component status where it is desired that some controlling component of the system inform a second component of the system of changes in second component status when that status changes and thereby eliminate any need to periodically poll that second component. The invention may be particularly suitable for data systems requiring high or maximum bandwidth such as video-on-demand type systems using RAID for data integrity.

We now describe an exemplary embodiment of the inventive structure relative to the diagrammatic illustration in FIG. 2. Host adapter 108 is interposed between the host computer 104 and one or more SAF-TE enclosures 122a–122d (or sets of SAF-TE enclosures 120, 121). In this embodiment, host adapter 108 is coupled to host computer 104 via host bus 106 such as for example via a PCI type bus; however, other types of bus may be used including for example, ISA bus, EISA bus, USB, or micro-channel bus.

Host adapter 108 comprises a controller or processor, such as central processing unit (CPU) 112 with its associated memory, here DRAM 114 and EPROM 116 connected to CPU 112 in conventional manner. DRAM 114 includes read/write memory storage for the host adapter operation, including: (i) providing storage for pointers to all requests made by the host as they are executed in the host adapter by its firmware, (ii) providing scratch pad and temporary memory storage for data being transferred to and from SCSI devices, and (iii) providing storage for other host adapter operating parameters. In this embodiment, DRAM 114 is advantageously used because it is fast and economical, but other types of read/write memory such as for example SDRAM which is faster but also more expensive may alternatively be used.

EPROM 116 provides storage for host adapter firmware including firmware for procedures to execute host requests for data to or from the disk drives, as well as host adapter (that is, internally generated) requests for component status and messages. The firmware stored therein controls all SCSI activities that a data read or write process may require, such as for example, bus arbitration, selection, messaging, command passing, data transfer status, and command completion acceptance. EPROM 116 is advantageously used because it is electronically alterable, but other types of memory such as Flash memory or ROM may be used.

Host adapter 108 also comprises a bridge circuit or simply a bridge 110 which provides all host bus interface logic and transfers data directly to and from host memory and provides logic means to interact with processor 112 within host adapter 108, including providing an interface between the source (primary) of the host bus 106 and the destination (secondary) bus 128 that connects the bridge to one or more SCSI Controllers 118. The use of bridge circuit 110 is to interface a first bus protocol with a different second bus protocol is conventional and not described further here.

Each SCSI controller 118a, 118b includes a data bus 128 for transferring data to/from host and local memory to the host adapter. The SCSI controller automatically handles all timing and control on the SCSI bus 123a as well as arbitration, selection, and SCSI transfers of commands, data, status, and messages, and waits for reselection by target device 141. SCSI Controller 118 also handles bus phases and sets an Attention Flag (used for informing a target device that the initiator has a message ready) as needed, and generates interrupts for reset, parity errors, selection/reselection, command completion, and bus free phase changes. The SCSI Controllers are coupled to the host bus 106 via (optional) bridge 110 and internal bus 128, and to the SCSI devices (such as devices within SAF-TE enclosures 122) via SCSI bus 123.

The SCSI controllers 118 may be of conventional design except that firmware must retain all outstanding commands in the active queue, including the inventive commands. This means that the inventive method may advantageously be adapted to existing hardware. The host adapter need not be a RAID controller and could, for example, be a host adapter supporting software RAID configuration. The hardware-based RAID controller is a specific example of a host adapter (HA).

An exemplary embodiment of a SAF-TE enclosure and components enclosed therein is now described relative to FIG. 2. Each SAF-TE enclosure 122 includes a SAF-TE Processor Device (SEP) 140 and other electrical, electro-mechanical, and mechanical components, including for example power supplies 172, cooling fans 171, temperature sensors 164, light emitting diodes (LED) 174, LED display panels 175, audible alarms, and one or more SCSI device slots which in a RAID system can be populated by hard disk drive units 177 (not considered to be part of the SAF-TE enclosure but enclosed and connected to the enclosure) by plugging a disk drive 177 having appropriate mechanical and electrical interface into the SCSI device slot. The SEP monitors the status of each component and turns ON/OFF various LED, alarms, displays messages on an LCD or other display, and so forth. The SAF-TE specification describes mandatory and optional characteristics of a compliant enclosure.

Figure 3:
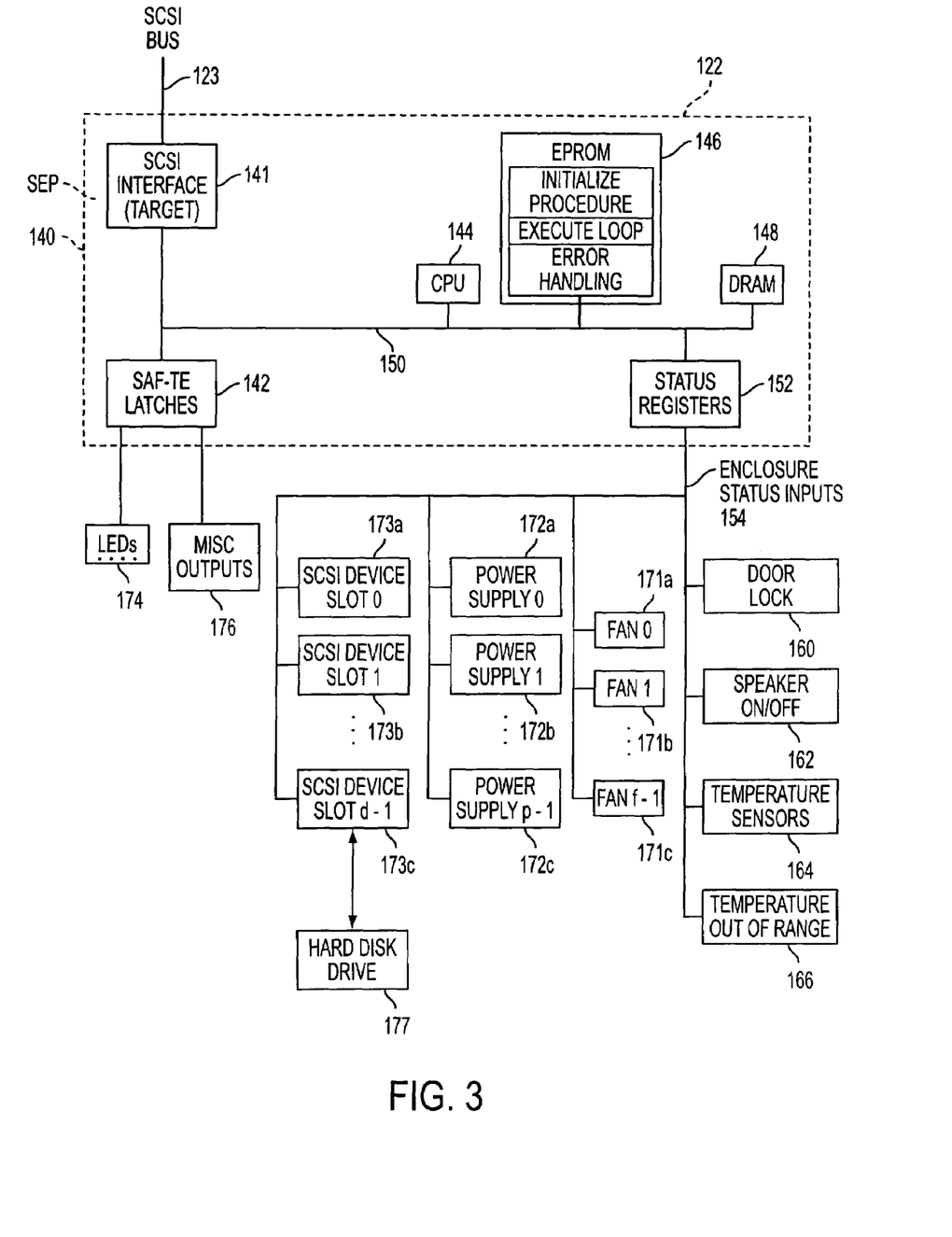
FIG. 3 is a diagrammatic illustration showing an embodiment of the inventive structure for an exemplary SAF-TE enclosure including the SAF-TE Processor Device (SEP).

Interface circuitry (such as SCSI interface circuitry used by a SCSI Target) 141 controls SCSI bus timing and phases in target mode, and arbitrates, reselects, waits for selection and sets bus phases when in target mode, where target mode is a mode of operation where devices respond to commands issued to it by the initiator (host adapter) as described in the SCSI architecture. SCSI Interface circuitry 141 also checks parity and SCSI ID, interfaces to the SCSI Bus and internal bus, and generates interrupts for reset, parity errors, selected/reselected, and command completion. The interface circuitry 141 is of conventional type known in the art, may be implemented as an SCSI target interface, SCSI interface adapter, SCSI chip, SCSI interface circuitry, or other device interface circuitry when protocol other than SCSI is employed, and not described further here.

SEP CPU 144 is responsible for fetching SEP firmware from SEP EPROM 146 and executing that firmware through SEP local memory (here SEP DRAM) 148 in order to process commands from host adapter 108 and transfer data to and from the several SAF-TE enclosure components already described.

Figure 5A:
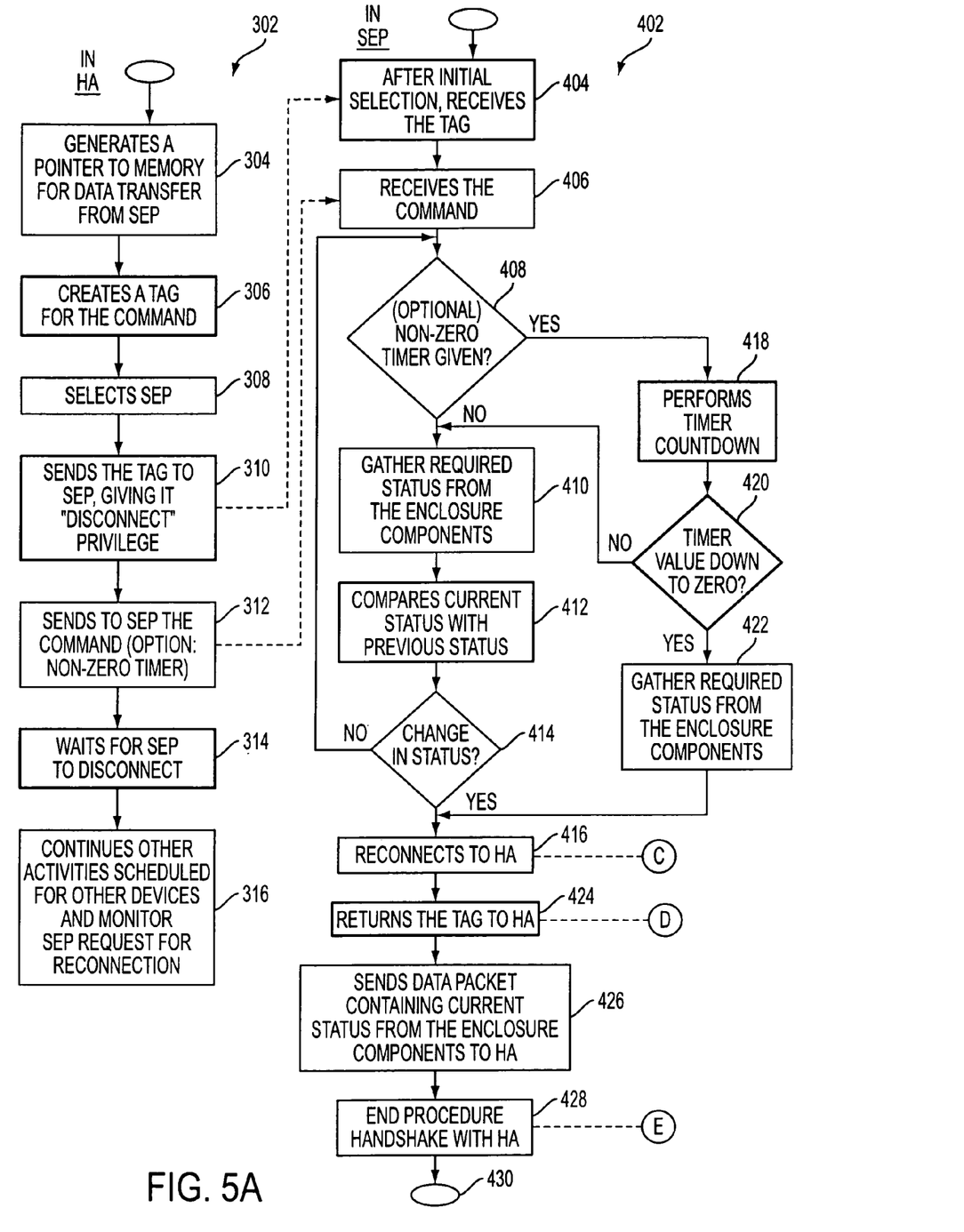
FIG. 5 is a diagrammatic flow-chart illustration showing an embodiment of a procedure executing in the host adapter and the SAF-TE Processor Device for executing the Read Device Slot Changed Status or Read Enclosure Changed Status commands, including optional time-out operation.

The firmware in SEP EPROM 146 implements several procedures and operations including an initialization routine that initializes the hardware into an initial state and sets a unit attention condition, error condition handling routines, and an execution loop routine. (See FIG. 5A) Execution loop routine includes the following functionality: (i) waits for selection and monitors message indications from the host adapter; (ii) controls input/output (I/O) process after selection; (iii) receives a Command Descriptor Block (CDB) from the host adapter and executes it; (iv) sends command completion status and messages to the host adapter; (v) gathers any required (and optional) enclosure status and stores it in local storage memory (e.g. RAM), and then transfers it to the host adapter when appropriate to do so; (vi) monitors enclosure component status changes; (vii) decrements times indicated by host adapter commands; and (viii) turns ON/OFF various LEDs indicating status or conditions in the enclosure.

The SEP DRAM 148 is used for local storage of operation parameters, enclosure component status, command completion status, messages, and the like, and also as a scratch memory. DRAM is advantageously used but any other memory type could be used. The SEP latches 142 drive LEDs 174 and provide other miscellaneous outputs. Status Registers 152 contain enclosure component status such as operating conditions of fans, power supplies, disk drive inserted/removed for each device slot, and various enclosure sensor conditions (for example, door lock ON/OFF 160, Speaker ON/OFF 162, sensor temperature 164, temperature out of range 166, and the like).

An exemplary hardware and firmware configuration having now been described, embodiments of the inventive procedures are now described.

Figure 4:
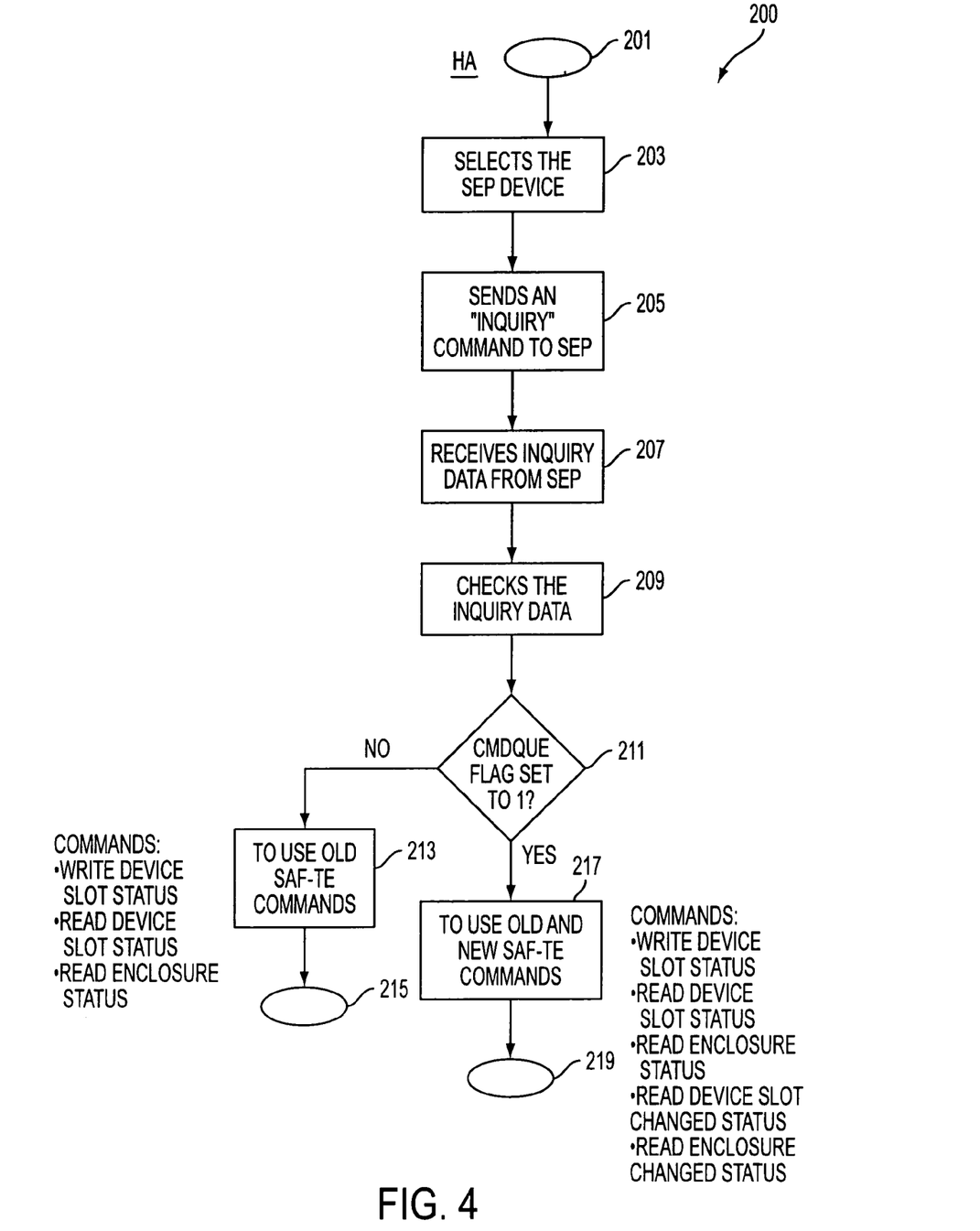
FIG. 4 is a diagrammatic flow-chart illustration showing an embodiment of a procedure for querying a SAF-TE to determine if the SAF-TE supports inventive read commands.

A procedure for determining whether a particular SEP device and SAF-TE enclosure supports two inventive commands (Read Device Slot Changed Status and Read Enclosure Changed Status) is now described relative to the diagrammatic flow chart in FIG. 4. The inventive command supporting inquiry procedure 200 is executed in the host adapter and begins (Step 201) with the host adapter selecting a particular SEP device (Step 203). The host adapter then sends an INQUIRY command to the selected SEP (Step 205) and in response the SEP sends and the host adapter receives the requested inquiry data (Step 207). The host adapter checks the inquiry data (Step 209) and if the command queue (CmdQue) Flag is set or cleared (Step 211), and if the CmdQue Flag is set to a predetermined state (for example, to "1") then the host adapter may use the conventional commands (Write Device Slot Status, Read Device Slot Status, Read Enclosure Status) as well as any one or more of the inventive commands (Read Device Slot Changed Status, and Read Enclosure Changed Status, Read Device Slot Changed Status with Timeout, and Read Enclosure Changed Status with Timeout) (Step 217). On the other hand, if the CmdQue Flag is not set to that predetermined state (e.g. is cleared to "0") then only the conventional commands are supported by the SAF-TE enclosure (Step 213). The Command Queue Flag state is established for a particular SEP that supports the inventive commands so that the appropriate state for the SAF-TE and SEP is established at the time the flag comparison is made. In one embodiment of the invention, the Command Queue (CmdQue) Flag is provided by bit 1 of Byte 7.

Command Queue Flag is issued to indicate that a "tagged" command in SCSI would be supported where conventional SAF-TE enclosure would not use it. For example, the Command Queue Flag is set to "1" if the SAF-TE supports tagged command queuing and to "0" if it does not support tagged command queuing. Tagged command queuing is known in the art and generally permits more than one command to be issued to satisfy a particular purpose without waiting for the previously issued command to be completed. Tagged command queuing has not heretofore been applied to SAF-TE related commands.

Figure 5B:
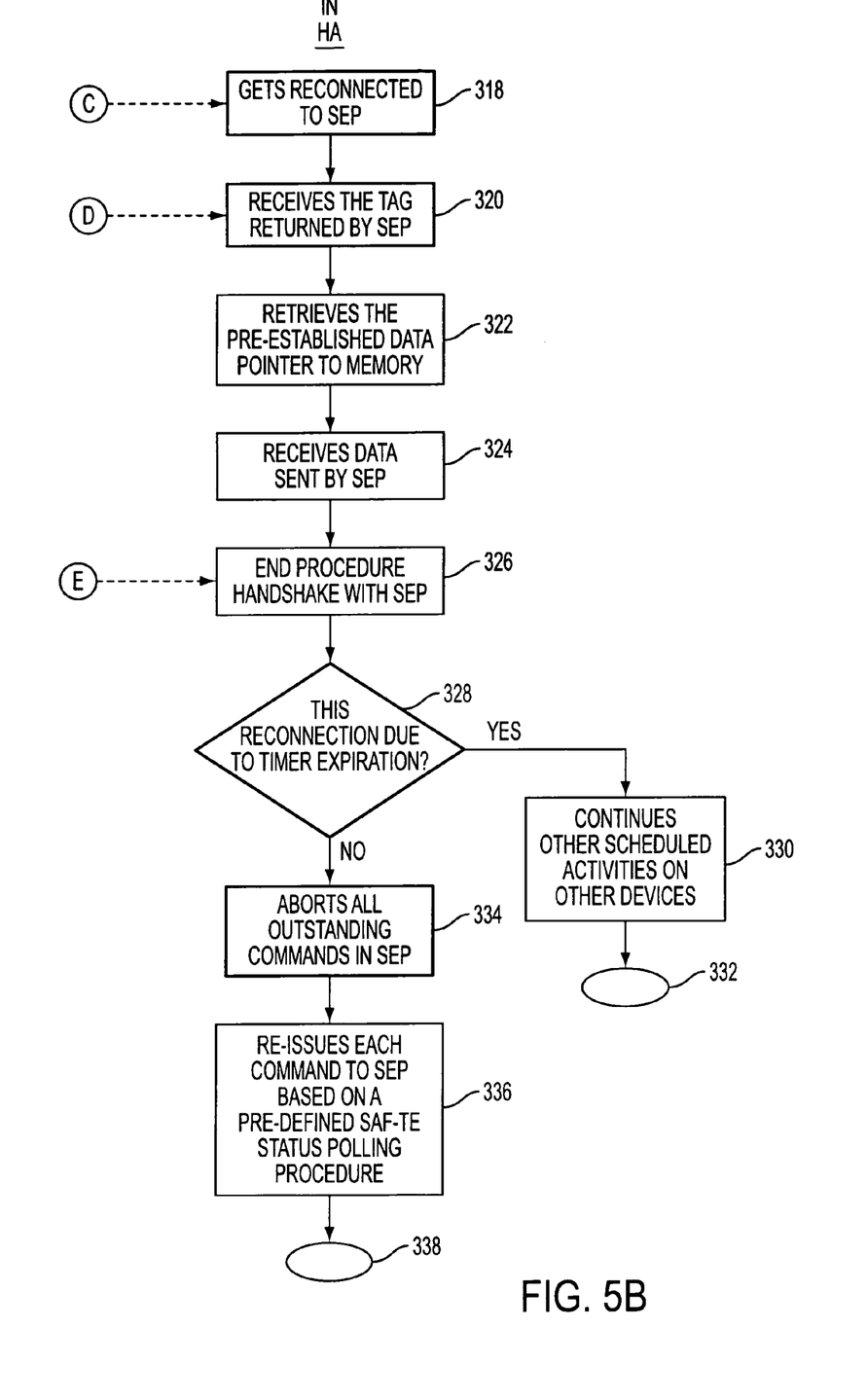

An embodiment of the Read Device Slot Changed Status procedure 302 is now described relative to the flow chart diagram in FIG. 5. The inventive commands (Read Device Slot Changed Status, Read Enclosure Changed Status, Read Device Slot Changed Status with Timeout, or Read Enclosure Changed Status with Timeout) are for convenience referred to as the "command" in FIG. 5. When one of the inventive commands is issued or executed by the host adapter, the host adapter generates a pointer to a location in memory that will be used when the enclosure or slot status data is transferred from the SEP (Step 304). Host adapter 108 also creates a "tag" for the command (Step 306) and selects the SEP (Step 308).

In one embodiment, the "tag" is a one eight-bit byte number in the range 0–255 which is used by each target ID or device to identify a particular command whose execution may require disconnection/reconnection by the SCSI device. Selection of the SEP results in the establishment of a connection between the host adapter and the SEP. Host adapter 108 then sends the tag to the selected SEP giving it "disconnect" privilege (Step 310). For example, if disconnect privilege is supported, the firmware knows that it should disconnect when a new command is received. Then, the host adapter sends the command to the SEP (Step 312), where the command may optionally include a non-zero timer timeout. Host adapter 108 then waits for the SEP to disconnect (Step 314), and once disconnected continues other activities scheduled for other devices (Step 316), such as for example, with other SEP coupled to a SCSI controller 118 in the host adapter. While the host adapter is continuing other activities scheduled for other devices, it also monitors for any SEP request for reconnection (Step 316). Thus the inventive method provides commands and procedures associated with the commands that retrieve component status changes and allow disconnection and reconnection by the SEP when ready to reconnect.

The actions and responses in the host adapter also impact the actions and responses in the SEP. After the Host adapter sends the tag (Step 310) and the command (Step 312) to the selected SEP, the selected SEP receives the tag (Step 404) and the command (Step 406) and for commands issued without a timeout, the SEP gathers current status from the enclosure components (Step 410) and compares the freshly gathered current status with the prior status (Step 412) which was stored earlier. If there has been no change in status (or if the change in status is smaller than some predetermined change, for example a one-degree change in enclosure temperature) then the SEP merely continues to gather status (Step 410) and monitor status changes (Step 412) in an iterative manner at some predetermined interval or according to some other predefined rules, until the comparison (Step 412) indicates there has been a change in status (Step 414). When a reportable change in status is identified, the SEP reconnects to the host adapter (Step 416), and returns the tag (Step 424) and the current enclosure status (Step 426) to the host adapter. On the SEP side, reconnection of the SEP to the host adapter (Step 416) has a counterpart in the host adapter being reconnected to the SEP (Step 318); and the status sent from the SEP (Step 426) has the counter-part of the host adapter receiving the tag returned by the SEP (Step 320).

Once the tag is received by the host adapter, the host adapter retrieves the pre-established (Step 304) memory pointer, and receives and stores the SEP status data into memory at that memory location (Step 322). The SEP procedure 402 ends once the current status has been sent and the end handshake procedure between the SEP and the host adapter (Step 428, Step 326) have completed. The SEP handshake procedure and the Host Adapter handshake procedure are conventional, and are described, for example in the SCSI specification.

When the optional non-zero timer timeout parameters are specified in the command (Read Enclosure Changed Status with Timeout or Read Slot Changed Status with Timeout) then additional steps are added to the SEP procedure 402 as follows. After receiving the command from the host adapter (Step 406), a determination is made as to whether the command specifies a timeout parameter (Step 408). If no timeout parameter is specified, then the procedure is unchanged from that described. However, if the command includes an indication that a timer should be observed, then additional steps (Steps 418, 420, 422) might be performed, the performance of Step 422 being conditional on the result of a test performed in Step 420. First, the SEP performs a timer count down (or increments a counter) and when the timer count value reaches zero (or any other predetermined counter value), the SEP gathers the required status from the enclosure or components therein, and reconnects to the host adapter (Step 416) as described above so that the tag and status may be returned.

Finally, in the host adapter after the handshake procedures have been completed (Steps 326 and 428), the host adapter procedure determines (Step 328) whether the reconnection was due to a timer expiration or to some other condition (e.g. SEP sending changed status), and if the reconnection was caused by a timer expiration, the host adapter continues with other scheduled activities on other devices (Step 330). On the other hand, if the reconnection was not due to a timer expiration or timeout, then the host adapter aborts all outstanding commands in the SEP (Step 334), and reissues each command to the SEP based upon a predetermined SAF-TE status procedure (Step 336). Commands are reissued in this situation, because under the inventive procedure time is no longer a real issue.

Some of the structure and operation of the invention having been described, embodiments of the commands themselves are now described.

The invention calls for the same status information to be exchanged by the host and the SAF-TE enclosure on an as "changed" basis rather than every 2 to 10 seconds or so as in prior art procedures. This has several advantages. Unlike, conventional systems and methods where it was required to repeatedly issue a command (and typically a series of commands) every few seconds to request status information and then process the information to detect changes, the inventive system and method provide for issuing a single sequence of commands to set up a mechanism for change detection. The single fixed sequence of commands is sufficient to poll for any changed status from the SEP. Furthermore, the changed status information conveniently has the same individual field definition and formatting as the status information received in response to conventional commands and procedures. As a result, the response from a SEP concerning SAF-TE component status is basically event driven, that is there is a response only when a reportable change has occurred. The new commands only need to be issued when necessary or convenient rather than every few seconds as was conventionally required. This methodology has additional advantages for the SEP as well. For example, the SEP device can monitor the status of each component without being interrupted by the host adapter every few seconds as with the conventional periodical SAF-TE polling, and as a result, both the host adapter and the SEP now have more freedom to do their own and each other's requested tasks.

The inventive system and method also advantageously eliminate the SAF-TE timeout incident associated with the conventional periodical polling scheme. Recall that if, for example because of a long tie up of the SCSI bus due to a drive problem, the host adapter misses a polling (say with a 10 second polling interval), the host adapter will post a SAF-TE timeout error in the conventional polling strategy, causing a bus reset.

Two new basic commands that support this functionality as derivatives of the READ BUFFER command are defined to retrieve the changed status of the enclosure and the changed status of each device slot, namely Read Enclosure Changed Status command and Read Device Slot Changed Status command. As such, the Buffer ID field of the READ BUFFER command is set to 05h and 06h, respectively. Bytes 3–6 of the CDB are set to zero. The data packets used by these commands are defined the same way as those of Read Enclosure Status command and Read Device Slot Status command, respectively. The SEP device needs to report the status only when a change in status occurs. These new commands are not subject to the usual timeout the HA establishes for basic SAF-TE commands defined in the prior art. Exemplary implementations of each of the inventive Read Enclosure Changed Status and Read Device Slot Changed Status commands are illustrated in Tables III and IV respectively. These command structures are illustrative only as it will be clear to workers having ordinary skill in the art in light of the description provided here, that there are many alternative ways of implementing and structuring commands having the attributes described here.

In an alternative embodiment, one may take a more conservative approach (a "conservative fault tolerance" approach) and execute several Read Device Slot Status commands to have greater confidence (near certainty) that all commands were properly received. One can also implement without the Read Device Slot Status commands which may be regarded as optional, but this does not represent a conservative approach or the preferred implementation of the invention. The data packets used by the Read Enclosure Changed Status and Read Device Slot Changed Status are unchanged from those in the conventional system except of course that the data is sent much less frequently.

TABLE III

Structure of READ BUFFER - Read Enclosure Changed Status

| Byte | Bit 7 | 6 | 5 | 4 | 3 | 2 | 1 | 0 |
|---|---|---|---|---|---|---|---|---|
| 0 | Operation Code (3Ch) | | | | | | | |
| 1 | Logical Unit Number | | | Reserved | | | Mode (01h) | |
| 2 | Buffer ID (05h) | | | | | | | |
| 3 | 00h | | | | | | | |
| 4 | | | | | | | | |
| 5 | | | | | | | | |
| 6 | | | | | | | | |
| 7 | Transfer Length (MSB) | | | | | | | |
| 8 | Transfer Length (LSB) | | | | | | | |
| 9 | 00h | | | | | | | |

TABLE IV

Structure of READ BUFFER - Read Device Slot Changed Status

| Byte | Bit 7 | 6 | 5 | 4 | 3 | 2 | 1 | 0 |
|---|---|---|---|---|---|---|---|---|
| 0 | Operation Code (3Ch) | | | | | | | |
| 1 | Logical Unit Number | | | Reserved | | | Mode (01h) | |
| 2 | Buffer ID (06h) | | | | | | | |
| 3 | 00h | | | | | | | |
| 4 | | | | | | | | |
| 5 | | | | | | | | |
| 6 | | | | | | | | |
| 7 | Transfer Length (MSB) | | | | | | | |
| 8 | Transfer Length (LSB) | | | | | | | |
| 9 | 00h | | | | | | | |

As an option, each of these two new commands may be implemented with a variation in which the command may use some or all of bytes 3–6 of its CDB to include a non-zero timeout value expressed in terms of seconds, minutes, or hours, which means that if a change in Enclosure Status or Device Slot Status has not occurred within the specified time, the SEP device is to check in with its current status when the timer expires. These command variants may be referred to as Read Enclosure Changed Status With Timeout and Read Device Slot Changed Status With Timeout.

Each of the two inventive commands may be issued twice, that is, one after another, the first instance providing a zero in CDB bytes 3–6, and the second instance providing a non-zero timeout value in bytes 3–6 of the CDB. Or stated in another way, sequentially issuing the command pair Read Enclosure Changed Status and Read Enclosure Changed Status With Timeout, or the pair Read Device Slot Changed Status and Read Device Slot Changed Status With Timeout. If a change occurs before the timer expires, the outstanding command (Read Enclosure Changed Status With Timeout or Read Device Slot Changed Status With Timeout) can be aborted. If the timeout occurs first, the other command (Read Enclosure Changed Status or Read Device Slot Changed Status) is kept outstanding until a change in status occurs.

As will be appreciated from the description, optional but convenient timers may be set to allow SAF-TE component status and slot status to be checked at any predetermined interval if desired, in addition to or separate from having changed status reported. For example, component status and/or slot status may be checked every 15 minutes, every hour, every 12 hours, every 5 days, or at any other interval. Furthermore, when a timer expires, SAF-TE status can be retrieved based on that timer timeout without disrupting the read changed status commands already in progress. Hence, having received a timer based status will not remove a pending change based status update. On the other hand, in one embodiment of the invention, when a changed status occurs, all other outstanding commands are aborted, to allow changed status polling to restart from scratch.

The SEP inquiry data may include an indication that the SAF-TE Processor (SEP) device supports this optional timer and timing feature in the Vendor Unique Parameters field. For example, the format of the SCSI INQUIRY Command is illustrated in Table V, any predetermined byte, may be used to indicate that a timer is supported (00b) or is not supported (01b). Further details of the structure of the SCSI Inquiry Command are provided in the SAF-TE Specification, for example at page 6 of that specification.

The Response Data format for the SCSI INQUIRY command for the inventive method and structure may provide the Timeout Feature Support Indicator, such as for example, a timeout feature flag bit within the Vendor Unique Parameters field (bytes 54–95) as illustrated in Table VI.

These four new commands, unlike the two conventional counterparts (Read Enclosure Status and Read Device Slot Status), operate to cause the SEP device to disconnect from the SCSI Host Adapter. Once disconnected, the SCSI bus channel that would otherwise be used for polling the SEP and for receiving the status information from the SEP in response to the polling, is free to support other bus activities. The SEP device reconnects to the host adapter and thereby uses bus cycles only when the specified condition occurs, namely when the timeout timer expires or a change in status occurs, whichever the case may be, and upon the occurrence of the specified condition, enclosure or slot status information is transferred to the host adapter according to the command.

While heavy input/output operations go on the SCSI bus as required by certain applications, no disruption to input/output operations on the SCSI bus will normally occur with the inventive system and method (particularly if the SEP device disconnects from the bus) as would such disruptions occur with the conventional periodical SAF-TE polling. Also, the maximum response time of the SEP device to any Write Buffer or Read Buffer command can be far greater than 2 millisecond as expected with the convention polling procedure based methods.

It is further noted, that although the inventive structures and methods provide superior performance as compared to conventional systems and methods, some legacy hardware may not support the inventive commands. The inventive system and method are compatible with such legacy hardware and the new commands and command protocol may be applied to multiple SAF-TE enclosures on the same bus, independent of whether such enclosures are compatible or not. In addition, the inventive system and method as well as conventional polling based procedures can simultaneously co-exist on the same system.

TABLE V

Structure of SCSI INQUIRY COMMAND

| Byte | Bit |||||||| 
|---|---|---|---|---|---|---|---|---|
| | 7 | 6 | 5 | 4 | 3 | 2 | 1 | 0 |
| 0 | Operation Code (12h) |||||||| 
| 1 | Logical Unit Number |||||| | 00h |
| 2 | 00h |||||||| 
| 3 | 00h |||||||| 
| 4 | Allocation Length (0h–60h) |||||||| 
| 5 | 00h ||||||||

TABLE IV

Structure of Response Data Format for SCSI INQUIRY COMMAND

| Byte | Bit |||||||| 
|---|---|---|---|---|---|---|---|---|
| | 7 | 6 | 5 | 4 | 3 | 2 | 1 | 0 |
| 0 | Peripheral Qualifier ||| | Peripheral Device Type |||| 
| 1 | 00h |||||||| 
| 2 | 0 | 0 | 0 | 0 | 0 | ANSI-Approved Version (02h) ||| 
| 3 | 0 | 0 | 0 | 0 | Response Data Format (02h) |||| 
| 4 | Additional Length |||||||| 
| 5 | 00h |||||||| 
| 6 | 00h |||||||| 
| 7 | 0 | 0 | 0 | 0 | 0 | 0 | 1 | 0 |
| 8 ... 15 | Vendor Identification |||||||| 
| 16 ... 31 | Product Identification |||||||| 
| 32 ... 35 | Firmware Revision Level |||||||| 
| 36 ... 43 | Enclosure Unique Identifier |||||||| 
| 44 ... 49 | SAF-TE Interface Identification String |||||||| 
| 50 51 52 53 | SAF-TE Specification Revision Level |||||||| 
| 54 ... 95 | Vendor Unique Parameters (Includes Optional Timeout Feature Support Indicator) ||||||||

The inventive method and structure also provide tagged command queuing. Tagged command queuing permits multiple commands to be issued one after another to satisfy a particular purpose without having to wait for any one of the multiple commands to be completed. The inventive Read Enclosure Changed Status, Read Device Slot Changed Status, Read Enclosure Changed Status With Timeout, and Read Device Slot Changed Status With Timeout commands support this type of tagged command queuing. The inventive commands are issued for tagged command queuing in the manner that is specified in the SCSI architecture, and as such, the inquiry data transferred by the host adapter in response to the SCSI INQUIRY command should specify support for tagged command queuing. Neither the capability nor the particular implementation of tagged command queuing is provided by the conventional Read Enclosure Status or Read Device Slot Status commands.

The characteristics of particular commands having been described, following is a description of the manner in which commands alone or in conjunction with other conventional SCSI and/or SAF-TE commands are used. In the description that follows, it is assumed that the versions of the commands without the timeout option are used, that is with CDB bytes 3–6 set to zero ("0").

After a SCSI bus reset or a command abort order with a BUS DEVICE RESET message (or an ABORT-type message) sent by the host adapter to the SEP device, following a normal interrogation routine, the host adapter should issue the following sequence of commands (referred to as Command Chain A) shown in Table VII to the SAF-TE Processor (SEP) device.

TABLE VII

List of Commands in Command Chain A.

| # | Command | Description |
| --- | --- | --- |
| 1 | Read Device Slot Status | — |
| 2 | Read Enclosure Status | — |
| 3 | Write Device Slot Status | — |
| 4 | Read Device Slot Status | Can be used for the HA to verify that the SEP device responds to the Write Device Slot Status command properly before it goes on to poll for changed status |
| 5 | Read Device Slot Changed Status | Tagged and disconnectable; SEP to reconnect to HA only when a change in device slot status occurs |
| 6 | Read Enclosure Changed Status | Tagged and disconnectable; SEP to reconnect to HA only when a change in enclosure status occurs |

A conventional TEST UNIT READY command generally provides means to check that a SEP device is ready to accept other commands. If the SEP device is ready, then it returns "GOOD" status in response; however, if the SEP device is not ready to accept new commands, a "CHECK CONDITION" status is returned with a sense key of "NOT READY." Therefore, one or more TEST UNIT READY commands may optionally be used within the chain of commands listed in Table VII. Also, the second Read Device Slot Status command listed in Command Chain A can be used for the host adapter to verify that the SEP device responds to the Write Device Slot Status command properly before it goes on to poll. Commands such as Write Device Slot Status, Read Device Slot Status and Read Enclosure are used in the same way as in conventional implementations.

Under one embodiment of the inventive method, whenever the host adapter detects a change in drive status (such as for example, when a disk drive becomes faulty, is undergoing a "rebuild" operation, or is made a "hot spare"), the host adapter should abort all outstanding commands previously issued to the SEP device and initiate or issue the sequence of commands listed in Command Chain A to the SEP device. This command sequence represents a conservative approach and fewer commands may be issued in some situations. The change is considered cleared by the SEP device as soon as the associated status is retrieved by the host adapter.

After a reconnection with the host adapter over the SCSI bus is initiated by the SEP device (as a result of the occurrence of a change in status and the prior issuance of one of the four inventive Read Changed Status commands), the SEP status is transferred to the host adapter over the SCSI bus. Upon receiving the changed status, the host adapter sets up or initiates an appropriate response (if any) for the changed status. For example, if a drive replacement was made in a slot in the SEP, the host adapter will start a rebuild operation on the drive as a result of a drive replacement action on the slot. If a power supply appears to have failed, then the host adapter will report a power supply failure to the host. Other changes, such as a small rise in temperature within the enclosure, may be sensed within the enclosure, but not be a sufficient change to warrant SEP-initiated reconnection to the host adapter to reporting the change. For example, a change in the absolute temperature value of a temperature sensor in the SEP enclosure by 1° F. should probably be ignored; however, a larger defined increment should be considered a significant change. Of course those changes that should be reported and those that may be ignored are under programmatic (e.g. software or firmware) control, typically by altering the instructions within a microprocessor or controller within the SAF-TE enclosure.

After receiving the changed status and taking appropriate action (if any) in response, the host adapter may then abort all outstanding commands, if any, it issued to the SEP device before receiving the status which were not initiated and/or were not completed, and issue the commands in Command Chain A to the SEP device again.

If a CHECK CONDITION is returned by the SEP device for any command issued to it, including any of the inventive commands or even conventional commands, then a SCSI REQUEST SENSE command is issued by the host adapter to the SEP device in the normal manner. The REQUEST SENSE command requests that the SEP device transfer sense data to the initiator, that is to the host adapter. Sense data pertains to the transport of data over the SCSI bus and is not used to report enclosure specific failures and status. Sense data includes a sense key which is a two character hexadecimal code that identifies such error conditions as no error occurred in the execution of the previous SCSI command (00h), not ready (02h), hardware error (04h), illegal request (05h), unit attention (06h), reserved for SAF-TE specific error condition (09h), and aborted command (0Bh).

If inquiry data from a SAF-TE enclosure indicates that tagged command queuing is not supported, the host adapter should not issue the inventive Read Change Status commands; rather, the host adapter should poll the SEP device in the conventional manner.

It will be clear to those workers having ordinary skill in the art in light of the description provided herein, that the inventive method may advantageously be practiced by implementing the inventive method and procedures with computer software and/or firmware stored in a memory and executing in one or more processors, for example in processors contained within the host adapter and the SAF-TE and/or SEP. Therefore, the invention provides computer program, computer program product, firmware, and electronic memory storing instructions for implementing the inventive methods and procedures.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. All publications and patent applications cited in this specification are herein incorporated by reference as if each individual publication or patent application were specifically and individually indicated to be incorporated by reference.

What is claimed:

1. A method for communicating to a host system a numerically variable characteristic of a subsystem, said method comprising the steps of:

said subsystem receiving a request from said host system to monitor said numerically variable characteristic of said subsystem and report to said host system a value of said characteristic or an amount of change of said characteristic when a minimum numerical amount of said change occurs, said request specifying said minimum numerical amount of said change; and in response to the receiving step, said subsystem monitoring said characteristic, and if and approximately when said minimum numerical amount of said change subsequently occurs in said said characteristic, said subsystem reporting a value of said characteristic or an amount of change of said characteristic to said host system, if no change occurs or less than said minimum numerical amount of change occurs before a predetermined time-out, said subsystem reporting to said host system a value of said characteristic or an amount of change of said characteristic upon said predetermined time-out.

2. A method as set forth in claim 1 wherein said characteristic of said subsystem is a characteristic of a component coupled to said subsystem.

3. A method as set forth in claim 1 wherein said characteristic is a temperature of said subsystem.

4. A method as set forth in claim 1 further comprising the steps of:

before the receiving step, establishing a communication link between said host system and said subsystem;

after the receiving step but before the reporting step, terminating said communication link; and after the terminating step but before said reporting step, establishing a communication link between said host system and said subsystem for said reporting.

5. A method as set forth in claim 4 wherein each of said communication links comprises SCSI commands and protocol.

6. A method as set forth in claim 1 wherein said subsystem comprises a SAF-TE enclosure, and said characteristic of said subsystem pertains to said SAF-TE enclosure.

7. A method as set forth in claim 1 wherein said subsystem comprises a SAF-TE enclosure and programming to support periodic SAF-TE polls made by said host system for said characteristic, and further comprising the step of said subsystem receiving periodic SAF-TE polls made by said host system, and said subsystem responding to said periodic SAF-TE polls by promptly reporting said characteristic for each of said polls, whether or not said characteristic has changed.

8. A computer system comprising a host system and a subsystem coupled to said host system, said computer system comprising:

first programming in said host system to generate and send a request to said subsystem to monitor a numerically variable characteristics of said subsystem and report to said host system a value of said characteristic or an amount of change of said characteristic when a minimum numerical amount of change in said characteristic occurs, said request specifying said numerical minimum amount of said change;

second programming in said subsystem to respond to said request by monitoring said characteristic of said subsystem, and if and approximately when said minimum numerical amount of said change subsequently occurs, reporting to said host system a value of said characteristic or an amount of change of said characteristic, if no change occurs or less than said minimum numerical amount of change occurs before a predetermined time-out, said subsystem reporting to said host system a value of said characteristic or an amount of change of said characteristic upon said predetermined time-out.

9. A system as set forth in claim 8 wherein said characteristic of said subsystem includes a characteristic of a component coupled to said subsystem.

10. A system as set forth in claim 8 wherein said characteristic is a temperature of said subsystem.

11. A system as set forth in claim 8 further comprising:

means for establishing a communication link between said host system and said subsystem before said first programming sends said request to said subsystem;

means for terminating said communication link after said first programming sends said request but before said subsystem responds to said request; and means for establishing a communication link between said host system and said subsystem after said terminating of said communication link but before said subsystem responds to said request, to enable said subsystem to report said status.

12. A system as set forth in claim 11 wherein each of said communication links comprises SCSI commands and protocol.

13. A system as set forth in claim 8 wherein said subsystem comprises a SAF-TE enclosure, and said characteristic of said subsystem pertains to said SAF-TE enclosure.

14. A system as set forth in claim 8 wherein said subsystem comprises a SAF-TE enclosure; and further comprising third programming within said subsystem to respond to periodic SAF-TE polls by promptly reporting said characteristic of said subsystem for each of said polls, whether or not said characteristic has changed.

* * * * *